(12) United States Patent
Sakai et al.

(10) Patent No.: US 6,628,348 B1
(45) Date of Patent: Sep. 30, 2003

(54) PLASMA ADDRESS ELECTROOPTICAL DEVICE

(75) Inventors: Osamu Sakai, Nara (JP); Sadahiko Yasukawa, Nara (JP); Kazuhiko Inoguchi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 334 days.

(21) Appl. No.: 09/632,941

(22) Filed: Aug. 4, 2000

(30) Foreign Application Priority Data

Aug. 5, 1999 (JP) .......................................... H11-221910
Jul. 18, 2000 (JP) ............................................ 2000-217783

(51) Int. Cl.$^7$ ................................................ G02F 1/133
(52) U.S. Cl. ............................................. 349/32; 313/517
(58) Field of Search ........................ 349/32; 313/517, 313/582, 584, 586, 587

(56) References Cited

U.S. PATENT DOCUMENTS 5,351,144 A * 9/1994 Tanamachi ................. 313/484
5,420,707 A * 5/1995 Miyazaki ..................... 313/582
6,130,504 A * 10/2000 Nakayama et al. ......... 313/582

FOREIGN PATENT DOCUMENTS

JP  08-123360  5/1996
JP  10-148820  6/1998

* cited by examiner

*Primary Examiner*—Toan Ton
(74) *Attorney, Agent, or Firm*—Nixon & Vanderhye P.C.

(57) ABSTRACT

A plasma address electrooptical device is provided, wherein the distance between a liquid crystal drive electrode 6a and an adjacent liquid crystal drive electrode 6b is set to be equal to or greater than the distance between the lower surface of said liquid crystal drive electrode 6a and the lower surface of a dielectric layer 3. Moreover, by providing additional electrodes between liquid crystal drive electrodes of the plasma address electrooptical device, the display leakage to adjacent pixels is reduced even further.

2 Claims, 7 Drawing Sheets

PLASMA ADDRESS ELECTROOPTICAL DEVICE

FIELD OF THE INVENTION

The present invention relates to a plasma address electrooptical device that controls the display of electrooptical elements by use of plasma discharge.

DESCRIPTION OF THE RELATED ART

Similar to the plasma display panel (PDP), a plasma address electrooptical device (plasma address liquid crystal display; PALC) is utilized as the major component of a large-sized flat panel display device.

An example of a plasma address electrooptical device utilizing a discharge plasma switch to drive a liquid crystal cell will now be explained.

FIG. 5 is a partial perspective view showing the plasma address electrooptical device according to the prior art. Actually, hundreds of liquid crystal drive electrodes and discharge cells are arranged in the device, but the drawing shows only a portion of them as an example.

As shown in FIG. 5, the plasma address electrooptical device 100 comprises liquid crystal cells 101 and plasma cells 102 mounted on a common dielectric layer 103. The plasma cell 102 comprises a plurality of discharge cells 105 formed between a dielectric layer 103 and a lower substrate 104. A plurality of grooves are formed to the surface of the lower substrate 104 facing the dielectric layer 103, and each discharge cell 105 is defined by a groove being sealed by the discharge layer 103. A gas capable of being ionized by discharge is sealed inside each discharge cell 105, and a pair of plasma electrodes 106 and 107 is formed to the bottom of each cell. When voltage is imposed to the discharge cell 105 utilizing one of the pair of plasma electrodes 106 and 107 as anode and the other as cathode, the gas sealed inside the discharge cell 105 is ionized, and discharge plasma is generated.

On the other hand, the liquid crystal cell 101 comprises a liquid crystal layer 109 mounted between the upper substrate 108 and the dielectric layer 103. A plurality of liquid crystal drive electrodes 110 arranged parallel to one another are formed on the surface of the upper substrate 108 facing the liquid crystal layer 109. The liquid crystal drive electrodes 110 are arranged so as to cross the grooves (discharge cells 105) formed on the lower substrate 104, and individual pixels are each defined on the crossed areas.

The displaying method according to this plasma address electrooptical device is explained with reference to FIG. 6.

As shown in FIG. 6(a), by discharging one discharge cell (not shown) corresponding to a selected data sequence, charged particles are stored to the charged particle storage portion 111 formed on the surface of the dielectric layer 103 facing the discharge cell, so that the potentials of the stored portion are 0 V. By simultaneously imposing voltage data corresponding to the selected data sequence to the plurality of liquid crystal drive electrodes 110, the discharge cells function as switching elements for the liquid crystal layer 109. Therefore, the amount of electric charge corresponding to the data sequence is stored to the charged particle storage portion 111 on the surface of the dielectric layer 103 facing the discharge cell, and the electric field corresponding to one data sequence is applied to the liquid crystal cell, the status of which is maintained. This procedure is repeated for the number of discharge cells, and the voltage imposed to each liquid crystal drive electrode 110 is maintained until the same discharge cell is discharged for the next frame. Thereafter, until the data for the next frame is transmitted (FIG. 6(d)), as shown in FIG. 6(b) and FIG. 6(c), data voltage corresponding to other discharge cell portions is imposed thereto, with the liquid crystal drive voltage being reversed. Every time the display is changed, the voltage imposed to the liquid crystal drive electrode 110 is reversed between positive and negative polarities. According to the example shown in FIG. 6, the device is driven so that voltage is imposed only to the pixel corresponding to red (R).

According to such plasma address electrooptical device, display leakage (hereinafter called "cross talk") tends to occur to adjacent pixels in the display sequence corresponding to the same discharge cell. In other words, although liquid crystal drive voltage is imposed to the liquid crystal drive electrode that corresponds to only one pixel constituting one data point, as a result, cross talk is observed on the display. When cross talk occurs, the display grade of the device reduces greatly. For example, if colored images are to be displayed, one pixel, in other words, one liquid crystal drive electrode is allocated to one of the colors, R (red), G (green) or B (blue), and a colored filter is mounted on the pixel. If cross talk occurs when only red is to be displayed on the screen, as shown in the example of FIG. 6 (when electric field is applied to only the pixel corresponding to R, and no electric field is applied to pixels corresponding to adjacent pixels G and B), display leakage is observed to portions of adjacent pixels G and B. As a result, clear red color cannot be displayed on the screen, and the color purity is reduced.

As shown in FIG. 6, 30 V is the amount of voltage needed to be imposed to the liquid crystal drive electrode in order to apply an electric voltage of 1 V/$\mu$m to the inner area of the liquid crystal layer. In other words, since the sum thickness of the liquid crystal layer and the dielectric layer is 30 $\mu$m, when 30 V is imposed to the liquid crystal drive electrode and charged particles are stored to the charged particle storage portion on the surface of the dielectric layer facing the discharge cell so that the electric potential thereof becomes 0 V, an electric field of 1 V/$\mu$m is applied to the interior of the liquid crystal layer.

The amount of leakage of an image to the adjacent pixels is hereinafter called the cross talk width. That is, as shown in FIG. 7, a center line shown by a chain single-dashed line is supposed to exist between pixels. The cross talk width refers to the length from the center line to the area of the adjoining pixel that is influenced by the information of a pixel. The intensity of display at the cross talk portion is hereinafter called the cross talk intensity. In other words, when a display of a pixel is leaked to adjacent pixels, the similarity of the display of the pixel and the display of the display leakage area is called the cross talk intensity. Actually, the cross talk intensity is expressed as strong when the display of a pixel is black and the display leakage area also displays black, and expressed as weak when the display of a pixel is black and the display leakage area displays a lighter color, such as gray.

Until now, cross talk was considered to be caused by the electric field that has been generated by the voltage imposed to the liquid crystal drive electrode and which protruded (leak out) beyond the intended electrode region. However, the amount of leakage of the electric field or the mechanism of the leakage was still mainly unknown, since it involved the structure of the device or the behavior of the discharged particles being stored.

Examples of the methods for restraining the cross talk proposed heretofore are explained in the following.

Japanese Patent Application Laid-Open Publication No. 8-123360 discloses a method for restraining cross talk caused by the thickness of the dielectric layer, by providing in advance a correction arithmetic process by a correction circuit to the data sequence signal that is to be applied to the liquid crystal drive electrode.

Moreover, Japanese Patent Application Laid-Open Publication No. 10-148820 discloses a method for restraining cross talk by arranging electrode groups in parallel with the liquid crystal drive electrodes on the surface of the dielectric layer facing the discharge cell. By arranging electrode groups, the ununiformity of charge density vanishes, and the fringe electrical field of adjacent liquid crystal drive electrodes is reduced, which leads to restrained cross talk.

SUMMARY OF THE INVENTION

However, the methods disclosed in the above-mentioned publications had the following problems.

The method disclosed in Japanese Patent Application Laid-Open No. 8-123360 utilizes a drive circuit for restraining cross talk, and therefore, a large-scale integrated circuit device must be additionally provided to the conventional plasma address electrooptical device. Accordingly, it was substantially difficult to perform a correction computing process corresponding to various images.

Moreover, the method disclosed in Japanese Patent Application Laid-Open No. 10-148820 includes electrodes arranged on the surface of the dielectric layer facing the discharge cell. Therefore, it was necessary to locate all the liquid crystal electrodes, the parallel electrode group and the discharge cells to their respective positions, and it was difficult to position all these elements.

The present invention aims at solving the above problems of the prior art. The object of the invention is to provide a plasma address electrooptical device that enables to restrain cross talk by a relatively simple yet effective method.

In order to solve the above-mentioned problems, the present invention provides a plasma address electrooptical device comprising a plurality of liquid crystal drive electrodes mounted on a first substrate, and a plurality of discharge cells formed on a second substrate, the liquid crystal drive electrodes being positioned so as to oppose to the discharge cells through at least a liquid crystal layer and a dielectric layer; wherein the distance between a first liquid crystal drive electrode and a second liquid crystal drive electrode adjacent the first liquid crystal drive electrode is either equal to or greater than the distance between the surface of the first liquid crystal drive electrode and the surface of the dielectric layer closer to the second substrate.

Moreover, it is preferable that the present device further comprises an auxiliary electrode being insulated from the liquid crystal drive electrodes which is each arranged between said first and second liquid crystal drive electrodes.

The plasma address electrooptical device according to the present invention comprises a plurality of liquid crystal drive electrodes mounted on a first substrate, and a plurality of discharge cells formed on a second substrate, the liquid crystal drive electrodes being positioned so as to oppose to said discharge cells through at least a liquid crystal layer and a dielectric layer; wherein auxiliary electrodes being insulated from said liquid crystal drive electrodes are each arranged between adjacent liquid crystal drive electrodes.

The plasma address electrooptical device according to the present invention preferably comprises a means for controlling the electric potential of the auxiliary electrodes.

The electric potential of the auxiliary electrodes is preferably set to 0 V according to the plasma address electrooptical device of the present invention.

The operation according to the present invention will now be explained.

According to the invention, the distance between the first liquid crystal drive electrode and the adjacent second liquid crystal drive electrode is set to be equal to or greater than the distance between the first liquid crystal drive electrode surface and the surface of the dielectric layer facing the second substrate, and thereby, cross talk is restrained. In other words, the distance between the first liquid crystal drive electrode to which voltage is imposed and the charged particle storage portion formed on the surface of the dielectric layer facing the discharge cell is either equal to or greater than the distance between adjacent liquid crystal drive electrodes. Therefore, the electric line of force generated from the first liquid crystal drive electrode to which voltage is imposed extends toward the charged particle storage portion on the surface of the dielectric layer facing the discharge cell. This weakens the electric field generated to adjacent pixel portions, and only gray color appears on the adjacent pixel areas. In other words, the cross talk intensity is reduced.

Even further, a novel effect could be expected by widening the distance between the liquid crystal drive electrodes. That is, when the distance between the liquid crystal drive electrodes widen, the width of the liquid crystal drive electrode reduces at the same time. The example of a 42-inch panel is explained. When considering the so-called HD (high density) type display, the repeating distance of the liquid crystal drive electrodes is approximately 180 $\mu$m. Accordingly, when the distance between the liquid crystal drive electrodes is set to 20 $\mu$m, the width of each liquid crystal drive electrode is 160 $\mu$m. Therefore, if the distance between the liquid crystal drive electrodes is set to 40 $\mu$m, the width of each liquid crystal drive electrode is reduced down by more than 10% to 140 $\mu$m. When the width of the liquid crystal drive electrode is reduced, the area of the charge particle storage portion formed on the surface of the dielectric layer facing the discharge cell is also reduced, and the amount of charged particles to be stored thereto can be reduced. Accordingly, the voltage needed to drive the liquid crystal in order to realize the same display status (luminance) may be reduced. When the liquid crystal drive voltage is reduced, the cross talk width is also reduced. In other words, the cross talk width is even further reduced by widening the distance between the liquid crystal drive electrodes.

As for the electric field applied to the liquid crystal layer, the thickness of the layer other than the liquid crystal layer and the dielectric layer may become a problem. For example, an ultraviolet block film (for example, a film mainly formed of titanium oxide) having a thickness of 2 to 3 $\mu$m may be inserted between the liquid crystal layer and the dielectric layer, in order to prevent ultraviolet from being radiated to the liquid crystal layer from the plasma unit. In this case, the thickness of the ultraviolet block film is added to the thickness of the liquid crystal layer and the dielectric layer, and electric field is applied to these three layers. That is, when ultraviolet block film exists within the device, the distance between the liquid crystal drive electrodes should be greater than the sum thickness of the three layers (the liquid crystal layer, the dielectric layer and the ultraviolet block layer), in order to reduce the cross talk intensity.

Moreover, according to the present invention, cross talk may be restrained by providing auxiliary electrodes insulated from liquid crystal drive electrodes to the area between first and second liquid crystal drive electrodes.

That is, when an auxiliary electrode exists between the first and second liquid crystal drive electrodes, the electric line of force generated from the charged particle storage portion on the surface of the dielectric layer facing the discharge cell is extended toward the nearest auxiliary electrode at first, before reaching the second liquid crystal drive electrode placed adjacent to the first electrode. The electric line of force will be converged to the edge of the second liquid crystal drive electrode, and the line of force is restrained from widening, which leads to reduced cross talk width.

Moreover, by providing all the above-explained features to one electrooptical device, the intensity and the width of the cross talk can be reduced simultaneously.

Moreover, according to the present invention, the cross talk may be further restrained by controlling the electric potential of the auxiliary electrodes.

For example, by applying a means to connect the auxiliary electrodes and a 0 V position through a connection cable, the auxiliary electrodes may be constantly controlled to 0 V. Thereby, the auxiliary electrodes and the adjacent second liquid crystal drive electrodes will have the same electric potentials, and therefore, no electric line of force will exist between the auxiliary electrodes and the second liquid crystal drive electrodes. Accordingly, the electric field above the adjacent second liquid crystal drive electrode is greatly reduced, since the only electric line of force existing on the second electrode is the one directly generated from the charged particle storage portion on the surface of the dielectric layer facing the discharge cell. Cross talk is thereby reduced even further.

DETAILED DESCRIPTION OF PREFERRED EMBODIMENTS

The preferred embodiments of the present invention will now be explained.

Embodiment 1

The plasma address electrooptical device and the operation thereof according to embodiment 1 will be explained with reference to the drawings.

Figure 1:
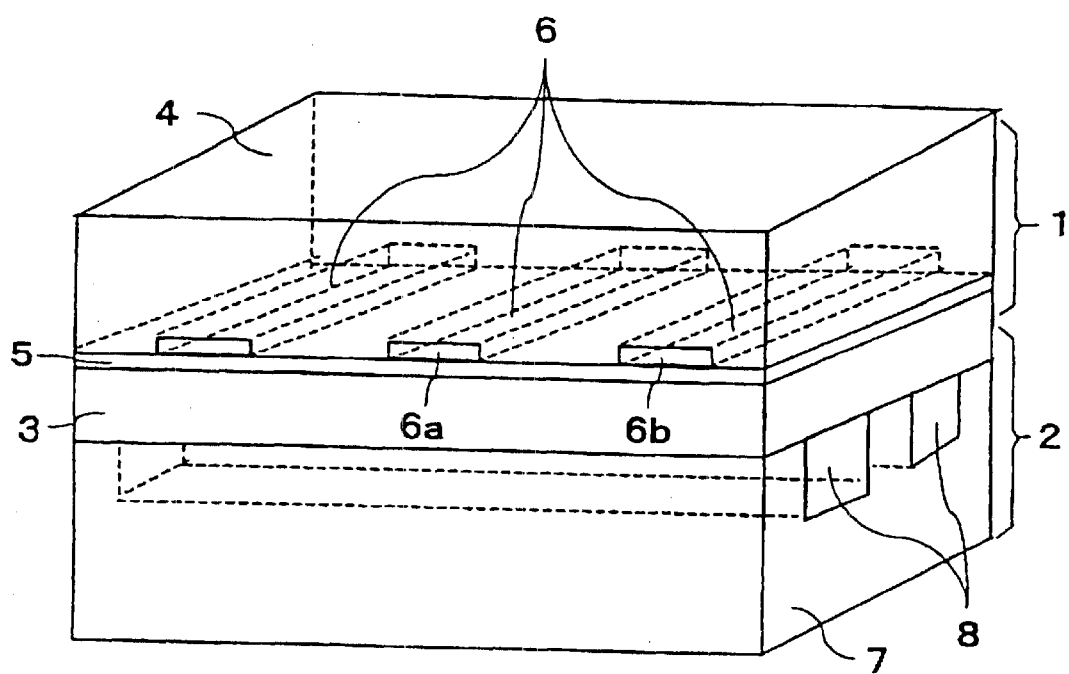
FIG. 1 is a partial perspective view for explaining the plasma address electrooptical device according to embodiment 1 of the present invention.

FIG. 1 is a partially transparent perspective view of the plasma address electrooptical device according to embodiment 1 of the present invention. Actually, hundreds of liquid crystal drive electrodes and discharge cells are arranged, but the drawing shows only a portion of them.

As shown in FIG. 1, the plasma address electrooptical device is structured so that a liquid crystal cell 1 and a plasma cell 2 are laminated on a common dielectric layer 3 placed therebetween.

The liquid crystal cell 1 has a liquid crystal layer 5 sandwiched between an upper substrate 4 and the dielectric layer 3. On the surface of the upper substrate 4 opposite the liquid crystal layer 5 is formed a plurality of stripe-shaped liquid crystal drive electrodes 6, which are arranged in parallel to each other. The liquid crystal drive electrodes 6 are formed by etching a transparent conductive material such as ITO (indium tin oxide), SnO2, ZnO and so on.

Glass is used to form the dielectric layer 3, but any other insulating film material such as other oxides or polymer film material such as plastic may also be used.

Moreover, the liquid crystal layer 5 is aligned according to various electrooptical operation modes. For example, according to need, alignment films may each be arranged on the surface of the upper substrate 4 and on the surface of the dielectric layer 3 facing the liquid crystal layer 5, so that the liquid crystal layer 5 is arranged to have a predetermined alignment.

On the other hand, the plasma cell 2 comprises a plurality of discharge cells 8 formed between the dielectric layer 3 and a lower substrate 7. The discharge cells 8 are defined by plural stripe-shaped grooves formed on the surface of the lower substrate 7 facing the dielectric layer 3 and arranged parallel to each other, the grooves being sealed by the dielectric layer 3. These discharge cells 8 are arranged so as to cross the liquid crystal drive electrodes 6 formed on the upper substrate 4. Individual pixel basis is defined on each crossed portion.

One pair of plasma electrodes (not shown) is formed on the bottom portion of the groove of each discharge cell 8. One of the pair of plasma electrodes works as anode and the other works as a cathode, in order to impose voltage to the gas enclosed within the discharge cell 8, thereby ionizing the gas and generating discharge plasma. The number of plasma electrodes may be greater, and even in such case, a similar discharge action is realized. According to the present invention, Ni is used as the material of the electrodes for causing the discharge, and a direct-current pulse voltage is imposeed between the two plasma electrodes in order to generate the discharge. However, the present invention is not limited to such example. The same function may be realized by covering the plasma electrodes with dielectric such as MgO and generating a so-called alternating-current discharge.

Xe gas is enclosed within the discharge cells 8, but any other gas that may be ionized by discharge can be used instead. Other rare-activated gas, such as He, Ar, Ne and Kr, or the mixture of these gases may be filled inside the discharge cells 8 to bring out the same display effects.

According to the plasma address electrooptical device of the preset embodiment, the distance between a liquid crystal driving electrode 6a and a neighboring liquid crystal electrode 6b is either equal to or greater than the distance between the surface of the liquid crystal driving electrode 6a and the lower surface of the dielectric layer 3. In the above explanation, the surface of the liquid crystal drive electrode 6 refers to the surface of the electrode 6 facing the liquid crystal layer 5, and the lower surface of the dielectric layer 3 refers to the surface of the dielectric layer 3 facing the discharge cells 8.

Next, an image is displayed on the plasma address electrooptical device, and the state of the cross talk at this time is observed in detail.

No color filters are used, and as for the liquid crystal, an electrooptical material displaying white when no electric field is applied, and displaying black completely when the electric field is 1 V/μm, is used. When an electric field of 0 V/μm to 1 V/μm is applied to the liquid crystal, the device displays gray.

At this time, three neighboring pixel bases are observed, while imposing positive and negative voltages corresponding to an electric field value of 1 V/μm to only the liquid crystal drive electrode 6R corresponding to the center pixel basis. According to the prior art, cross talk appeared most noticeably when voltage is imposed to only the center pixel basis of three neighboring pixels.

Figure 2:
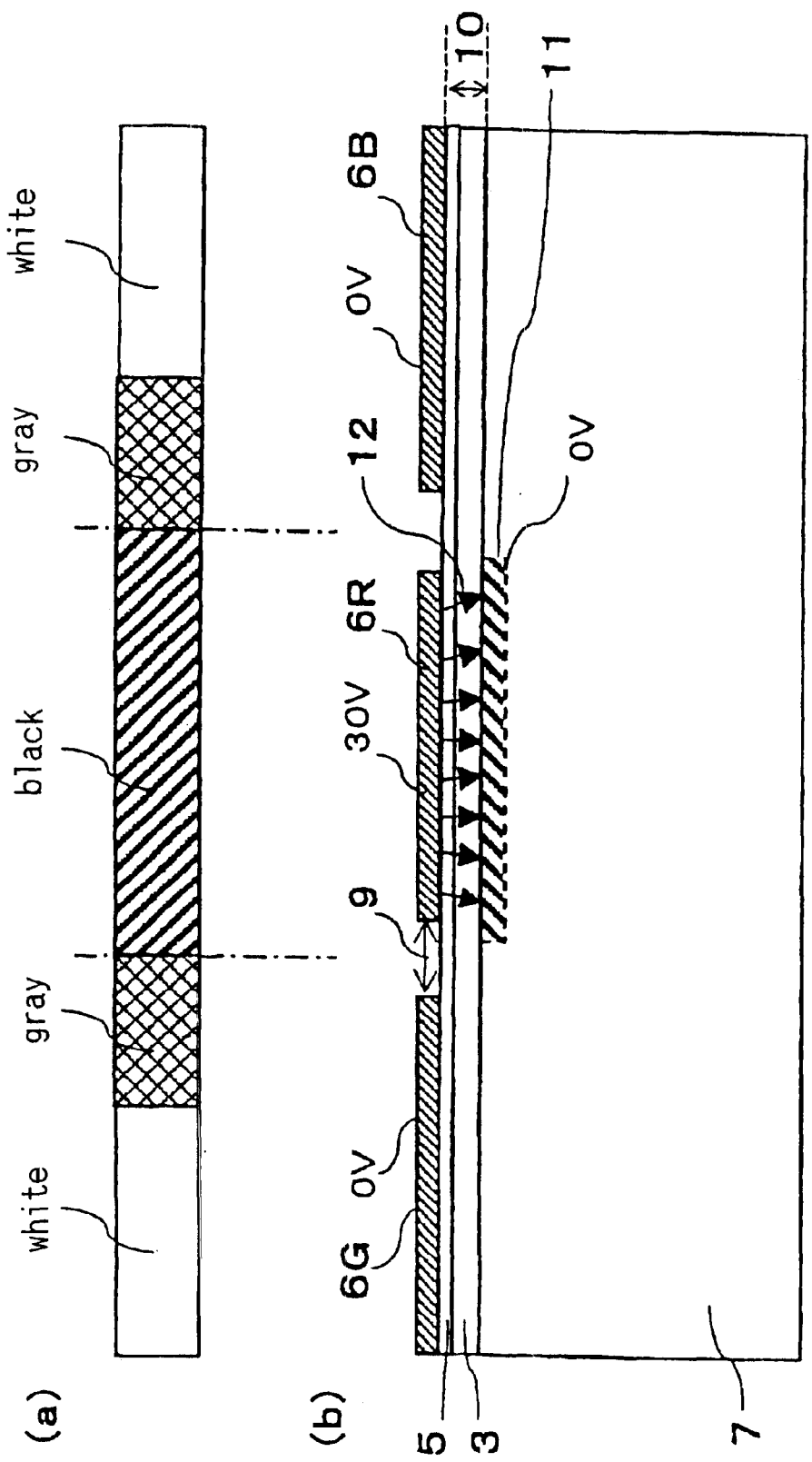
FIG. 2(a) shows the status of display on the actual display screen of the plasma address electrooptical device according to an embodiment of the present invention, and (b) is a partial cross-sectional view thereof showing the electric line of force.

The state of the actual display on the screen at this time (when the voltage of a charged particle storage portion on the surface of the dielectric layer facing the discharge cells is 0 V) is shown in FIG. 2(a), and the partial cross-sectional view of the plasma address electrooptical device and the state of the electric line of force according to the present embodiment is shown in FIG. 2(b). Here, the liquid crystal drive electrodes corresponding to the neighboring pixels are referred to as 6G, 6R and 6B, respectively.

As shown in FIG. 2(a), no black color appeared on the neighboring pixels, and cross talk was restrained. The reason for this is considered as follows.

When considering the voltage imposed liquid crystal drive electrode 6R as the basis, the distance 9 between the adjacent liquid crystal drive electrodes 6G or 6B is either equal to, or greater than, the distance 10 between the surface of the liquid crystal drive electrode 6R and the lower surface of the dielectric layer 3 having charged particles stored thereto and thereby being 0 V. Accordingly, as shown in FIG. 2(b), the electric line of force 12 generated from the liquid crystal drive electrode 6R having voltage imposed thereto mainly extends toward the charged particle storage portion 11 on the lower surface of the dielectric layer 3. Thereby, the electric field generated to the adjacent pixel bases become weak, and only gray color appears on the neighboring pixel portions, reducing the cross talk intensity.

Moreover, when a layer other than the liquid crystal layer and the dielectric layer exists between the surface of the liquid crystal drive electrode and the lower surface of the dielectric layer, the distance 10 between the surface of the liquid crystal drive electrode and the lower surface of the dielectric layer should be determined adding thereto the thickness of that layer.

According to the present invention, the liquid crystal layer is formed of a liquid crystal material that displays white when no electric field is applied thereto. However, the present embodiment is not limited to such liquid crystal, and the layer may be formed of a liquid crystal material that displays black when no electric field is applied thereto.

EXAMPLE 1

According to the present example, a plasma address electrooptical device is manufactured with a dielectric layer 3 having a thickness of 25 μm, a liquid crystal layer 5 having a thickness of 5 μm, and a distance 9 between the liquid crystal drive electrodes set to 40 μm. The cross talk of the device is observed in detail. The only components existing in the region between the liquid crystal drive electrode surface and the lower surface of the dielectric layer are the liquid crystal layer 5 and the dielectric layer 3. Therefore, the distance 10 between the surface of the liquid crystal drive electrode and the lower surface of the dielectric layer is 30 μm, so the distance 9 between adjacent liquid crystal drive electrodes is greater than the distance 10 between the liquid crystal drive electrode surface and the lower surface of the dielectric layer.

The result of the cross talk observed here according to a method similar to that explained in embodiment 1 is shown in Table 1. The state of display on the actual display screen is shown in FIG. 2(a), and the partial cross-sectional view and the electric line of force according to the plasma address electrooptical device of the present embodiment is shown in FIG. 2(b).

TABLE 1

| | Distance between liquid crystal drive electrodes | Distance between electrode lower surface and dielectric layer lower surface | Cross talk width | |
|---|---|---|---|---|
| | | | Black | Gray |
| Embodiment 1 | 40 μm | 30 μm | 0 μm | 80 μm |
| | 30 μm | 30 μm | 0 μm | 80 μm |
| Comparison Example 1 | 20 μm | 30 μm | 10 μm | 70 μm |

Similar to embodiment 1, according to the present example, no black color appeared on the adjacent pixel portions, as shown in Table 1. Only gray color appeared as cross talk, and therefore, the cross talk intensity is reduced.

Moreover, a plasma address electrooptical device is manufactured with the distance 9 between adjacent liquid crystal driver elements set to 30 μm, which is equal to the distance 10 between the electrode surface and the lower surface of the dielectric layer. The cross talk of the device is observed similarly as embodiment 1, and the result is shown in Table 1. Similar to embodiment 1, no black color is observed on the neighboring pixel portions of the device according to this comparison example. Only gray color appears as a result of the cross talk, and therefore, the cross talk intensity is reduced.

That is, if the distance between the liquid crystal drive electrodes is equal to or greater than the distance between the liquid crystal drive electrode surface and the lower surface of the dielectric layer, no black color appears on the adjacent pixel portions. Only gray color appears as a result of the cross talk, and therefore, the cross talk intensity is reduced.

Embodiment 2

The structure of the device according to the present embodiment is similar to that of embodiment 1, except for the thickness of the dielectric layer 3, which is set to 55 μm, and the distance 9 between the liquid crystal driver elements, which is set to 80 μm. The device is driven according to the same conditions as embodiment 1.

The results are shown in Table 2. Similar to embodiment 1, no black color appears on the adjacent pixel portions.

Only gray color appears as a result of the cross talk, and therefore, the cross talk intensity is reduced.

TABLE 2

|  | Distance between liquid crystal drive electrodes | Distance between electrode lower surface and dielectric layer lower surface | Cross talk width | |
|---|---|---|---|---|
|  |  |  | Black | Gray |
| Embodiment 2 | 80 µm | 60 µm | 0 µm | 160 µm |
| Comparison example 2 | 40 µm | 60 µm | 20 µm | 140 µm |

In other words, by setting the distance between the neighboring liquid crystal drive electrodes to be greater than the distance between the liquid crystal drive electrode surface and the lower surface of the dielectric layer, cross talk intensity is reduced.

COMPARISON EXAMPLE 1

The present example is formed to have a similar structure as that of embodiment 1, except for the distance between the liquid crystal drive electrodes, which is set to 20 µm. The device is driven according to the same conditions as embodiment 1. In other words, a plasma address electrooptical device is formed, having the distance between liquid crystal drive electrodes being shorter than the distance between the liquid crystal drive electrode surface and the lower surface of the dielectric layer. The cross talk of the device is observed in detail.

Figure 7:
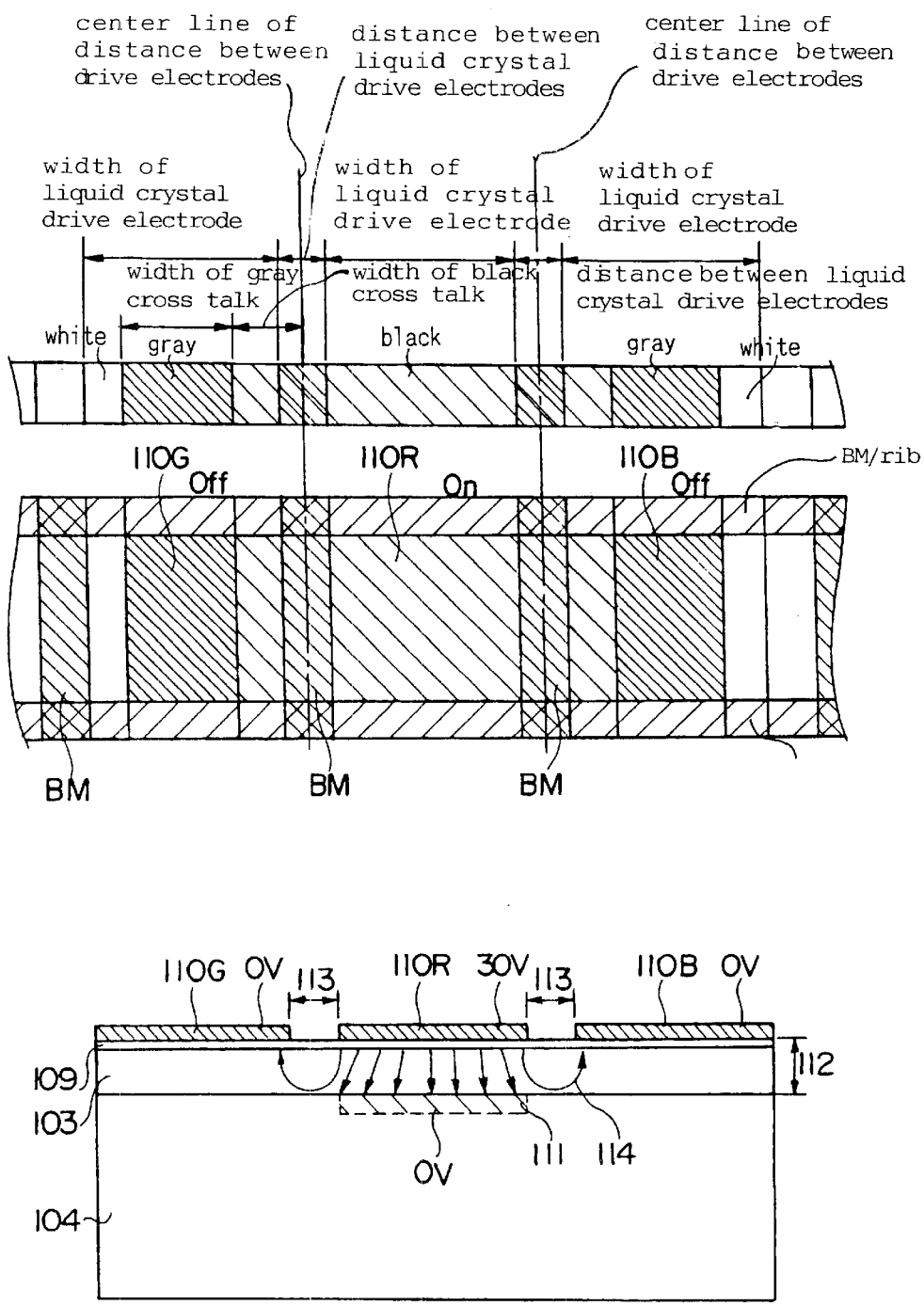
FIG. 7(a) shows the status of display on the actual display screen of the plasma address electrooptical device according to a comparison example, and (b) is a partial cross-sectional view thereof showing the electric line of force.

The result is shown in Table 1. Moreover, the state of display on the actual display screen is shown in FIG. 7(a), and the partial cross-sectional view and the electric line of force according to the plasma address electrooptical device of the preset comparison example is shown in FIG. 7(b).

When considering the voltage-imposed liquid crystal drive electrode 110R as the basis, the distance 113 between the neighboring liquid crystal drive electrodes 110G or 110B (distance between liquid crystal driver elements) is shorter than the distance 112 between the surface of the liquid crystal drive electrode 110R and the lower surface of the dielectric layer 103 having charged particles stored thereto and thereby being 0 V. Accordingly, as shown in FIG. 7(b), the electric line of force 114 generated from the liquid crystal drive electrode 110R having voltage imposed thereto mainly extends toward the neighboring liquid crystal drive electrodes 110G and 110B. This generates electric field, and thereby, black color appears to a portion of the adjacent pixels.

COMPARISON EXAMPLE 2

The present comparison example is formed to have a similar structure as that of embodiment 2, except for the distance 113 between the liquid crystal drive electrodes, which is set to 40 µm. The device is driven according to the same conditions as embodiment 2.

The result is shown in Table 2. Moreover, the state of display on the actual display screen is shown in FIG. 7(a), and the partial cross-sectional view and the electric line of force according to the plasma address electrooptical device of the preset comparison example is shown in FIG. 7(b).

According to the present comparison example, the electric line of force generated from the liquid crystal drive electrode 110R having voltage imposed thereto mainly extends toward the adjacent liquid crystal drive electrodes 110G and 110B, similar to comparison example 1. The electric field generated thereby causes portions the adjacent pixels to display black.

Embodiment 2

The structure of the plasma address electrooptical device according to embodiment 2 and the operation thereof is explained with reference to the accompanied drawings.

Figure 3:
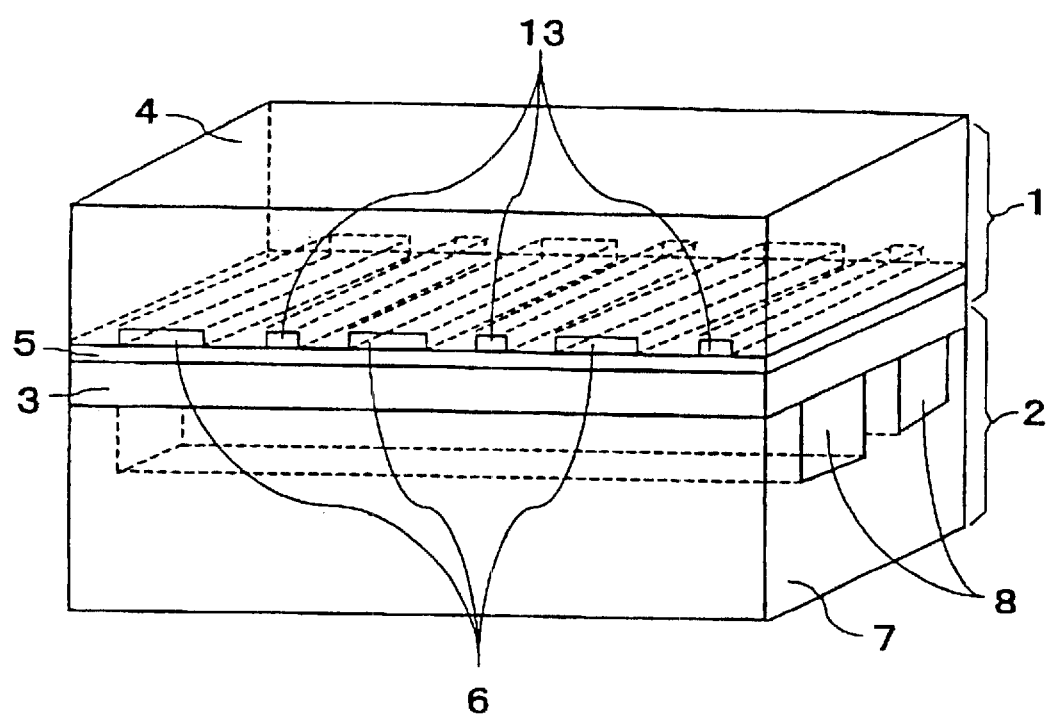
FIG. 3 is a partial cross-sectional view for explaining the plasma address electrooptical device according to embodiment 2 of the present invention.

FIG. 3 is a partial perspective view for explaining the plasma address electrooptical device according to embodiment 2 of the present invention. Actually, hundreds of liquid crystal drive electrodes and discharge cells are arranged, but the drawing shows only a portion of them.

As shown in FIG. 3, the plasma address electrooptical device according to embodiment 2 has a basic structure same as that of embodiment 1, but further comprising auxiliary electrodes 13 arranged between the liquid crystal drive electrodes 6.

The auxiliary electrodes 13 are insulated from adjacent liquid crystal drive electrodes 6. One simple method for forming the electrodes 13 may be simultaneously forming the electrodes 13 with the liquid crystal drive electrodes 6 and by the same material as electrodes 6. According to such method, there is no need for an extra process to form the electrodes 13, but the method is not limited thereto. Moreover, the auxiliary electrodes may be positioned anywhere as long as it is between the liquid crystal drive electrodes, but when it is positioned at the center of the interval between the drive electrodes, the auxiliary electrodes will equally effect the pixel bases.

According to the embodiment, no color filters are used, and as for the liquid crystal, an electrooptical material displaying white when no electric field is applied, and displaying black completely when the applied electric field is 1 V/µm is used. When an electric field of 0 V/µm to 1 V/µm is applied to the liquid crystal, the device displays gray.

At this time, three neighboring pixel bases are observed, while imposing positive and negative voltages corresponding to an electric field value of 1 V/µm to only the liquid crystal drive electrode 6R corresponding to the center pixel basis. According to the prior art, cross talk appeared most noticeably when voltage is imposed to only the center pixel basis of three neighboring pixels.

The state of the actual display on the screen at this time (when a charged particle storage portion at the surface of the dielectric layer facing the discharge cells is 2 V/µm) is shown in FIG. 4(a), and the partial cross-sectional view of the plasma address electrooptical device and the state of the electric line of force according to the present embodiment is shown in FIG. 4(b). Here, the liquid crystal drive electrodes corresponding to the neighboring pixels are referred to as 6G, 6R and 6B, respectively.

As shown in FIG. 4(a), by forming auxiliary electrodes 13 between the liquid crystal drive electrodes 6 (in other words, between 6G and 6R, between 6R ad 6B, and between 6B and 6G), the cross talk width is reduced even further. The reason for this is considered as follows.

Figure 4:
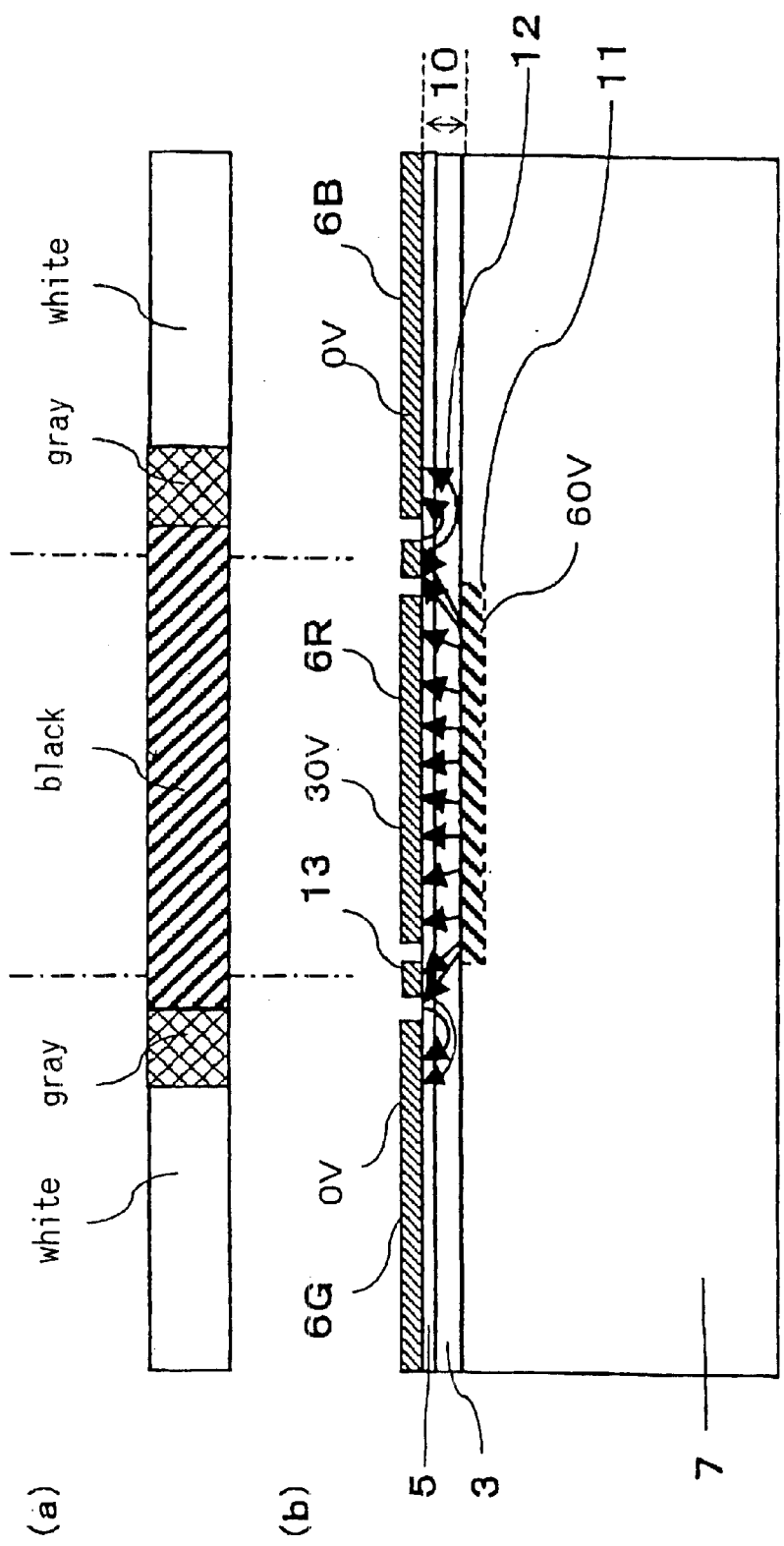
FIG. 4(a) shows the status of display on the actual display screen of the plasma address electrooptical device according to an embodiment of the present invention, and (b) is a partial cross-sectional view thereof showing the electric line of force.
Figure 5:
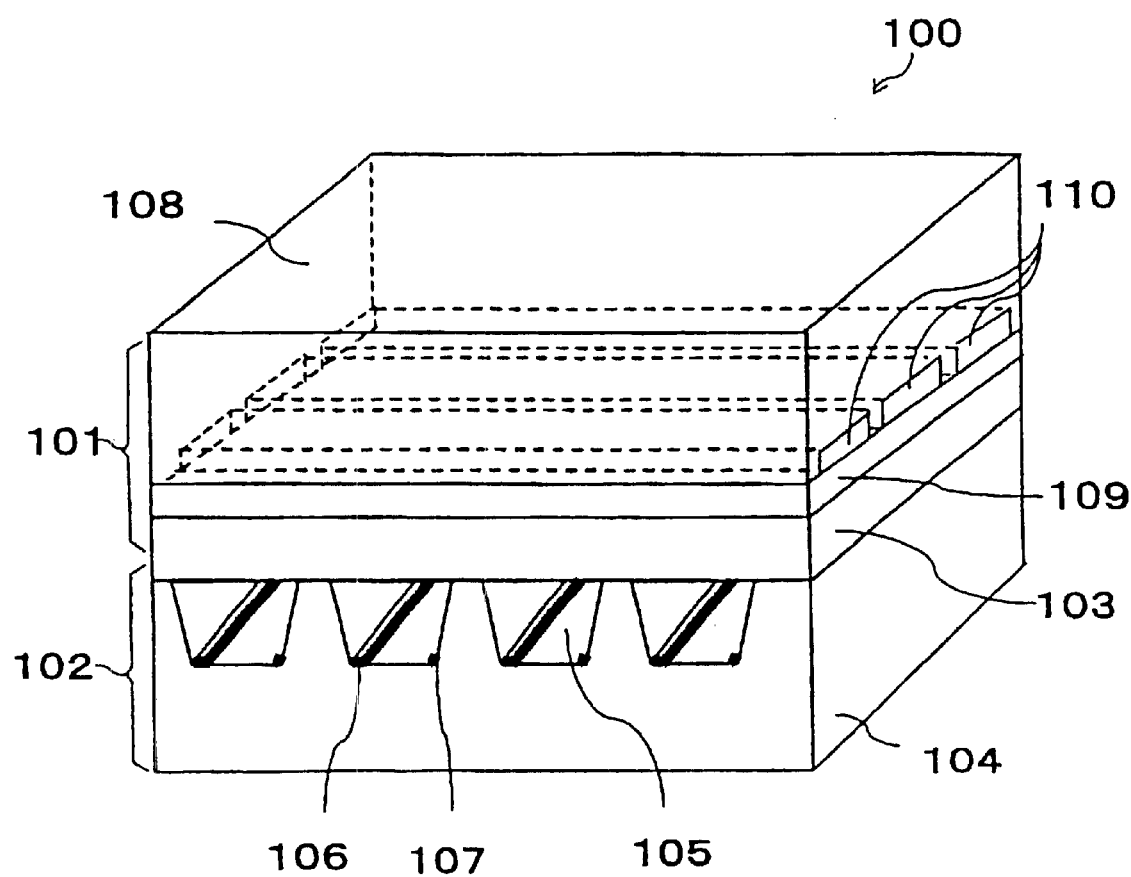
FIG. 5 is a partial cross-sectional view showing the plasma address electrooptical device according to the prior art.
Figure 6:
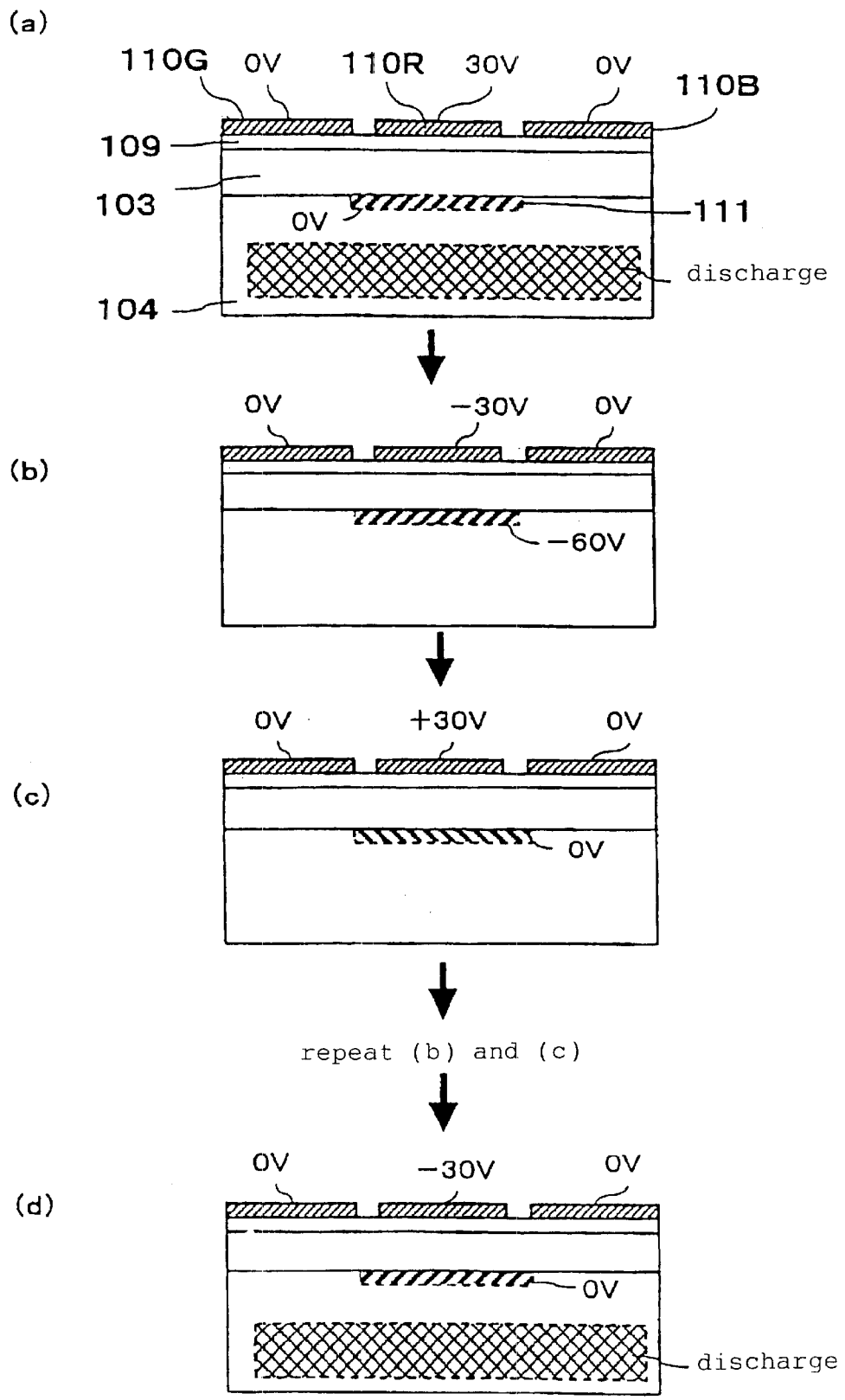
FIG. 6 is a schematic view showing the variation of the electric potential according to time while driving the liquid crystal.

Even when a discharge cell is not being discharged, the liquid crystal drive voltage is constantly varied between positive and negative values in order to write in data to other discharge cell portions. When the polarity of the voltage is opposite to the polarity that stores the charged particles to the surface of the dielectric layer 3 facing the discharge cell, the electric potential of the charged particle storage portion 11 positioned on the surface of the dielectric layer 3 facing the discharge cell rises up to double the maximum voltage for driving the liquid crystal. At this time, the electric line of force 12 extends from the charged particle storage portion 11 toward adjacent liquid crystal drive electrodes 6G and 6B. However, since auxiliary electrodes are arranged between the electrodes 6, the electric line of force 12 generated from the charged particle storage portion 11 extends toward the auxiliary electrodes 13 first, and then thereafter, extends toward the adjacent liquid crystal drive electrodes 6G and 6B. Therefore, as shown in FIG. 4(*b*), the electric line of force 12 is converged to the end area of the liquid crystal drive electrodes 6G and 6B, and the line of force is restrained from spreading. This reduces the width of gray color, and thereby reduces the cross talk width.

The present embodiment utilizes a liquid crystal that displays white when no electric field is applied thereto, but the embodiment is not limited to such, and a liquid crystal that displays black when no electric field is applied thereto may be used instead.

Embodiment 3

According to the present example, a plasma address electrooptical device is manufactured with a dielectric layer having a thickness of 25 μm, a liquid crystal layer having a thickness of 5 μm, and the distance between the liquid crystal drive electrodes set to 20 μm. The cross talk of the device is observed in detail.

No color filter is used, and as the liquid crystal, an electrooptical material displaying white when no electric field is applied thereto and displaying black completely when the applied electric field is 1 V/μm is used. When an electric field of 0 to 1 V/μm is applied, the device displays gray.

Moreover, the auxiliary electrodes are insulated from the liquid crystal drive electrodes, and having a floating electric potential. Simultaneously as when forming the liquid crystal drive electrodes by etching an even ITO film according to a pattern, the auxiliary electrodes are also formed according to a pattern. Therefore, the auxiliary electrodes are formed without an extra process.

At this time, three neighboring pixel bases are observed, while imposing positive and negative voltages corresponding to an electric field value of 1 V/μm to only the liquid crystal drive electrode 6R corresponding to the center pixel basis. The result is shown in Table 3. Further, FIG. 4(*a*) shows the display status on the actual display screen, and FIG. 4(*b*) shows the partial cross-sectional view and the details of the electric line of force of the plasma address electrooptical device according to the present embodiment.

TABLE 3

| Distance between liquid crystal drive electrodes | Distance between electrode lower surface and dielectric layer lower surface | Auxiliary electrodes (y/n) | Cross talk width Black | Cross talk width Gray |
|---|---|---|---|---|
| Embodiment 3 | 20 μm | 30 μm | Y | 10 μm | 40 μm |

As shown in FIG. 4(*a*) and Table 3, cross talk width is reduced when auxiliary electrodes 13 are formed between the liquid crystal drive electrodes 6 (in other words, between 6G ad 6R, between 6R an 6G, and between 6B and 6G). The reason for this is considered as follows.

As shown in FIG. 4(*b*), electric line of force 12 is generated from the charged particle storage portion 11 on the surface of the dielectric layer 3 facing the discharge cell, and extends toward the liquid crystal drive electrodes 6G and 6B. However, since auxiliary electrodes 13 exist between the electrodes 6, the electric line of force 12 generated from the charged particle storage portion 11 extends toward the auxiliary electrode 13 at first, which is placed closer to the storage portion. Thereafter, the line of force extends toward the adjacent liquid crystal drive electrode 6G or 6B. Therefore, the electric line of force 12 is converged to the end portion of the liquid crystal drive electrodes 6G and 6B, and the line of force is restrained from spreading. This reduces the width of gray color, and thereby reduces the cross talk width.

Moreover, according to the present embodiment, the gray color width is greatly reduced compared to the comparison example 1, which proves that the effect of providing auxiliary electrodes is outstanding.

Embodiment 4

The structure of the present embodiment is similar to that of embodiment 3, except that according to the present embodiment, the distance between the liquid crystal drive electrodes is set to 40 μm. In other words, the present embodiment relates to forming auxiliary electrodes between liquid crystal drive electrodes, and further having the distance between the liquid crystal drive electrodes set to be greater than the distance between the liquid crystal drive electrode surface and the lower surface of the dielectric layer.

The result is shown in Table 4. When auxiliary electrodes 13 are formed between liquid crystal drive electrodes 6, and when the distance between the liquid crystal drive electrodes are greater than the distance between the surface of the liquid crystal drive electrodes and the lower surface of the dielectric layer, the cross talk width is reduced. The reason for this is considered as follows.

TABLE 4

| Distance between liquid crystal drive electrodes | Distance between electrode lower surface and dielectric layer lower surface | Auxiliary electrodes (y/n) | Cross talk width Black | Cross talk width Gray |
|---|---|---|---|---|
| Embodiment 4 | 40 μm | 30 μm | Y | 0 μm | 40 μm |

The electric line of force 12 generated from the charged particle storage portion 11 on the surface of the dielectric layer 3 facing the discharge cell extending toward the liquid crystal drive electrodes 6G and 6B first heads toward the auxiliary electrodes 13 existing between the electrodes 6. Thereafter, the line of force extends toward the adjacent liquid crystal drive electrode 6G or 6B. Therefore, the electric line of force 12 is converged to the end portion of the liquid crystal drive electrodes 6G and 6B, and the line of force is restrained from spreading. This reduces the cross talk width. Moreover, since only a very small amount of the electric line of force directly extends from the charged particle storage portion 11 to the adjacent liquid crystal drive electrodes 6G and 6B, no black color appears on the adjacent pixel bases, and accordingly, the cross talk intensity is also reduced.

According further to the present embodiment, the gray color width has reduced to half the width compared to that of embodiment 1, which proves that the effect of the auxiliary electrodes is outstanding.

Embodiment 5

The present embodiment is similar to embodiment 4, except that according to the present embodiment, the electric potential of the auxiliary electrodes are controlled to 0 V. In other words, the present embodiment relates to a device comprising auxiliary electrodes arranged between the liquid crystal drive electrodes, with the distance between the liquid crystal drive electrodes set greater than the distance between the liquid crystal drive electrode surface and the lower surface of the dielectric layer, and with the electric potential of the auxiliary electrodes controlled to 0 V. According to the present invention, the auxiliary electrodes are controlled to 0 V constantly by connecting the auxiliary electrodes and a 0 V region through connector cables, but is not limited thereto.

The result is shown in Table 5. By controlling the electric potential of the auxiliary electrode to 0 V, the cross talk is reduced even further. The reason is considered as follows.

TABLE 5

| | Distance between liquid crystal drive electrodes | Distance between electrode lower surface and dielectric layer lower surface | Auxiliary electrodes (y/n) | Cross talk width | |
|---|---|---|---|---|---|
| | | | | Black | Gray |
| Embodiment 5 | 40 μm | 30 μm | Y (0 V) | 0 μm | 25 μm |

In this case, since the electric potential of the auxiliary electrodes 13 are controlled to 0 V, the auxiliary electrodes 13 and the adjacent liquid crystal drive electrodes 6G and 6B become equal potentials. Therefore, no electric line of force extends from the auxiliary electrodes 13 toward adjacent liquid crystal drive electrodes 6G and 6B. The only electric field existing on the adjacent liquid crystal drive electrodes 6G and 6B is the electric line of force 12 that extends from the charged particle storage portion 11 on the surface of the dielectric layer facing the discharge cell, which is further weakened. Therefore, the cross talk width is reduced.

According to the present embodiment, the gray color width is even further reduced compared to embodiment 3, which proves that the effect of controlling the auxiliary electrodes to 0 V is outstanding.

Embodiment 6

The present embodiment is similar to embodiment 5, except that the present embodiment employs another method to control the electric potential of the auxiliary electrodes. In other words, the present embodiment includes auxiliary electrodes positioned between liquid crystal drive electrodes, and the distance between the liquid crystal drive electrodes is set greater than the distance between the liquid crystal drive electrode surface and the lower surface of the dielectric layer, wherein the electric potential of the auxiliary electrodes 13 is set to ⅓ the absolute value of the liquid crystal drive voltage to be imposed to the adjacent liquid crystal drive electrodes, and with a reversed polarity.

According to the present embodiment, such electric potential is realized by adding a potential dividing element to the circuit for generating the liquid crystal drive voltage, and connecting the output to the liquid crystal drive electrodes and the auxiliary electrodes and a 0 V potential portion, but the method is not limited thereto.

The result is shown in Table 6. Cross talk is further reduced by controlling the electric potential of the auxiliary electrodes. The reason is considered as follows.

TABLE 6

| | Distance between liquid crystal drive electrodes | Distance between electrode lower surface and dielectric layer lower surface | Auxiliary electrodes (y/n) | Cross talk width | |
|---|---|---|---|---|---|
| | | | | Black | Gray |
| Embodiment 6 | 40 μm | 30 μm | Y (electric potential controlled) | 0 μm | 15 μm |

The electric line of force 12 generated from the charged particle storage portion 11 of the surface of the dielectric layer 3 facing the discharge cell 8 extends toward the nearest auxiliary electrode 13. On the other hand, since the electric potential of the auxiliary electrode 13 is smaller than the electric potential of the adjacent liquid crystal drive electrodes 6G and 6B, an electric line of force 12 generated from the adjacent liquid crystal driving electrodes 6G and 6B extends toward the auxiliary electrodes 13. Therefore, the electric line of force 12 extending directly from the charged particle storage portion 11 on the surface of the dielectric layer 3 toward the liquid crystal drive electrodes 6G and 6B is cancelled, and no electric field exists to the adjacent liquid crystal drive electrodes 6G and 6B. Thereby, the cross talk width is reduced even further.

According to the embodiment, the electric potential of the auxiliary electrodes 13 is set to ⅓ the absolute value of the liquid crystal drive voltage imposed to the adjacent liquid crystal drive electrodes 6G and 6B, and with a reversed polarity. It is not preferable to select a greater electric potential value, since the electric line of force generated from the adjacent liquid crystal drive electrodes 6G and 6B toward the auxiliary electrode 13 becomes too strong.

According to the present embodiment, the gray color width is further reduced even compared to embodiment 4, which proves that the effect of controlling the electric potential of the auxiliary electrodes is outstanding.

As explained, according to the plasma address electrooptical device of the present invention, the intensity and the width of display leakage (cross talk) generated to the adjacent pixels are reduced, either by setting the distance between the liquid crystal drive electrodes to be equal to or greater than the distance between the liquid crystal drive electrode surface and the lower surface of the dielectric layer, or by arranging auxiliary electrodes between the liquid crystal drive electrodes. According to the present invention, the display quality of the plasma address electrooptical device, such as purity of color, is improved.

We claim:

1. A plasma address electrooptical device comprising a plurality of liquid crystal drive electrodes mounted on a first substrate, and a plurality of discharge cells formed on a second substrate, said liquid crystal drive electrodes being positioned so as to oppose to said discharge cells through at least a liquid crystal layer and a dielectric layer; wherein the distance between a first liquid crystal drive electrode and a second liquid crystal drive electrode adjacent said first liquid crystal drive electrode is either equal to or greater than the distance between the surface of said first liquid crystal drive electrode and the surface of said dielectric layer closer to said second substrate.

2. The plasma address electrooptical device according to claim 1, wherein an auxiliary electrode being insulated from said liquid crystal drive electrodes is arranged between said first and second liquid crystal drive electrodes.

* * * * *